United States Patent [19]
Vandenbergh et al.

[11] Patent Number: 6,068,774
[45] Date of Patent: May 30, 2000

[54] BIOLOGICAL CONTROL OF AGRICULTURAL WASTE ODOR

[75] Inventors: Peter A. Vandenbergh, Sarasota; Hiren K. Trivedi, Tampa, both of Fla.

[73] Assignee: Osprey Biotechnics, Inc., Sarasota, Fla.

[21] Appl. No.: 09/136,588

[22] Filed: Aug. 19, 1998

Related U.S. Application Data

[63] Continuation-in-part of application No. 08/819,855, Mar. 17, 1997, Pat. No. 5,980,747.

[51] Int. Cl.[7] ...................................................... C02F 3/34
[52] U.S. Cl. ......................... 210/611; 210/906; 435/262.5
[58] Field of Search .................................. 210/610, 611, 210/916, 631; 435/252.34, 253.3, 247–250, 262.5, 281, 876, 877

[56] References Cited

U.S. PATENT DOCUMENTS

| | | | |
|---|---|---|---|
| 4,508,824 | 4/1985 | Olsen | 435/253 |
| 4,605,502 | 8/1986 | Hata | 210/611 |
| 4,673,505 | 6/1987 | Wong | 210/611 |
| 4,727,039 | 2/1988 | Hata | 435/260 |
| 4,800,158 | 1/1989 | Vanderbergh | 210/611 |
| 4,822,490 | 4/1989 | Dyadechko et al. | 210/611 |
| 4,870,012 | 9/1989 | Vanderbergh | 210/611 |
| 4,910,143 | 3/1990 | Vandenbergh | 435/262 |
| 4,970,000 | 11/1990 | Eppler et al. | 210/611 |
| 5,494,580 | 2/1996 | Baskys et al. | 210/611 |
| 5,627,069 | 5/1997 | Powlen | 210/611 |
| 5,656,486 | 8/1997 | Daniels | 435/252.4 |
| 5,716,523 | 2/1998 | Powlen | 210/611 |

OTHER PUBLICATIONS

Mackie, R.I., et al J. Animal Science, vol. 76 pp. 1331–1342 (1998).

Swine Odor Task Force Report published Mar. 1, 1995 by the North Carolina Agricultural Research Service, North Carolina State University.

*Primary Examiner*—Thomas G. Wyse
*Attorney, Agent, or Firm*—Ian C. McLeod

[57] ABSTRACT

The present invention provides compositions and methods for controlling fecal odor production that develops from agricultural waste which accumulates because of the scale of hog and chicken farming. The compositions for controlling odor in waste comprise isolates of Pseudomonas sp. that assimilate ammonia, degrade skatole and reduce COD. The present invention further provides methods for controlling odors in animal waste storage facilities using the abovementioned Pseudomonas sp. compositions.

18 Claims, 4 Drawing Sheets

CHROMATOGRAM A 6,068,774

BIOLOGICAL CONTROL OF AGRICULTURAL WASTE ODOR

CROSS-REFERENCES TO RELATED APPLICATIONS

This application is a Continuation-in-Part of U.S. patent application Ser. No. 08/819,855, filed Mar. 17, 1997, now U.S. Pat. No. 5,980,747.

BACKGROUND OF THE INVENTION (1) Field of the Invention

The present invention relates to a method for the control of odors that develop from agricultural waste containing fecal matter or urine or combinations thereof which accumulates in animal farming. In particular, the present invention relates to the use of Pseudomonas sp. strains that assimilate ammonia into proteins necessary for biomass, degrade skatole, and reduce COD. The present invention further provides a composition comprising Pseudomonas sp. strains which degrade ammonia at least 500 ppm in fecal waste matter, urine, or combinations thereof for use in odor control from said waste. The present invention further provides aqueous compositions that are stable for long periods at room temperature prior to use for controlling odor production from said waste.

(2) Description of the Related Art

Animals raised for food consumption by humans or other useful purposes are raised in large numbers. These large concentrations of animals lead to the production of large amounts of solid and liquid waste materials. Typically, the waste material is collected and maintained in animal waste holding pits situated beneath or adjacent to a facility in which the animals are housed. Sometimes, the wastes are stored in lagoons, waste holding tanks, waste wetlands or other type of waste holding facility. The waste material is allowed to degrade by activity of naturally occurring microorganisms or by addition of compositions consisting of specific microorganisms. As the pits become full, the waste materials are removed usually by pumping and the degraded waste materials are then often spread across crop fields for their fertilizer value. While means for degrading and utilizing animal wastes has been extensively investigated in the prior art, there is another aspect of animal wastes that has only recently become a concern, offensive odors.

Offensive odors from animal wastes have long been associated with animal production. However, with the recent advent of large animal farming operations and the migration of urban populations to areas of close proximity to these farming operations, offensive odors produced by wastes from animal farms has become a matter of great concern to animal producers, municipalities, and regulatory authorities (reviewed in R. I. Mackie, et al (1998). J. Animal Science, vol. 76, pp. 1331–1342). While feed and body odors are not usually considered offensive, odor generated from animal waste such as manure and its decomposition during collection, handling, storage, and spreading are considered offensive. Decomposition of manure generates a wide variety of volatile compounds and intermediates which are emitted into the environment. These compounds are the source of the offensive odors associated with animal waste. In addition to being offensive to smell, many of the compounds are harmful to the environment. For example, fecal matter contains approximately 50% ammonia and urine contains 97% urea nitrogen which is readily converted to ammonia by microbial urease. The ammonia produced volatilizes into the atmosphere, which enhances the deposition of sulfate and nitrate, creating acid rain that acidifies lakes, soils, and woodlands. In addition to the environmental and atmospheric consequences, the loss of nitrogen by ammonia volatilization, wastes large quantities of nitrogen which could be used for crop production.

While a number of compositions and methods for their use have been introduced to process animal waste, none of the compositions or methods solve the problem of offensive odor production from animal wastes.

In U.S. Pat. Nos. 4,605,502 and 4,727,039 to Hata compositions and methods for use of the compositions for purifying animal waste from water and water-containing material are provided. Specifically, compositions consisting of certain bacterial strains of Thiobacillus, Pseudomonas, or Nitrobacter which satisfy the requirements of the "SNC theory" established by Hata were shown to be useful for degrading animal waste products and for some strains reducing ammonia concentrations. However, Hata neither recognized the problem of offensive odors, nor disclosed that the compositions were effective at reducing offensive odors produced by animal wastes.

In U.S. Pat. Nos. 5,627,069 and 5,716,523 to Powlen compositions and methods for using the compositions are provided for treating on-site animal waste pits with a composition consisting of certain Lactobacillus bacteria in order to soften and fluidize hardened solid wastes therein. While the compositions disclosed were effective at softening animal waste that had solidified in waste pits, Powlen neither acknowledged the problem of offensive odors from waste pits nor disclosed that the compositions were effective at reducing odors associated with waste pits.

In U.S. Pat. No. 5,656,486 to Daniels a method is provided for treating and conditioning poultry manure with naturally occurring microorganisms to form an organic product that is capable of biologically removing hydrocarbon-based molecules from soils and other materials. The method does not address the production of odor from poultry manure.

While the prior art has provided compositions for treating animal waste materials, the art has remained silent on the compositions and methods for controlling odor production from animal waste pits. Therefore, there remains a need and demand for methods and compositions for treating animal waste pits or similar waste holding facilities so as to reduce the production of offensive odors. Such compositions and methods should have sufficient efficacy to make their use practical with respect to farm economics and be environmentally safe. Furthermore, the compositions and methods should be compatible with existing equipment and waste holding facilities and not require use of additional expensive equipment. Preferably, in addition to reducing offensive odors emanating from waste sites, the methods and compositions should also be effective at reducing buildup of animal waste products. The applicants' invention provides compositions and methods that reduce production of offensive odors and thereby provide for the safe, long term maintenance of animal waste pits or other similar waste holding facilities.

SUMMARY OF THE INVENTION

The present invention provides compositions and methods for controlling fecal odor production that develops from agricultural waste which accumulates because of the scale of hog and chicken farming. The compositions for controlling odor in waste comprise isolates of Pseudomonas sp. that assimilate ammonia, degrade skatole and reduce COD.

Specifically these Pseudomonas sp. are isolates which can assimilate ammonia at a level of at least 500 ppm in fecal matter, urine, or a combination thereof. The present invention further provides aqueous compositions that are stable for long periods at room temperature prior to use for controlling odor production from said waste.

The present invention further provides methods for controlling odors in animal waste holding facilities using the abovementioned Pseudomonas sp. compositions. The method of the present invention is effective in controlling odors under both aerobic and anaerobic conditions. The method reduces the amount of ammonia produced in animal waste facilities and also degrades skatole and manure.

Objects

Therefore, it is an object of the present invention to provide compositions comprising Pseudomonas sp. which can assimilate ammonia for use in controlling odor production in animal waste facilities.

Another object of the present invention is to provide a method for aerobic treatment of animal waste facilities which result in the control and reduction of offensive odors. A further object of the method of the present invention is to provide a method for anaerobic treatment of animal waste facilities which result in the control and reduction of offensive odors.

A further object is to provide the compositions comprising the Pseudomonas sp. in an aqueous form that is stable for long periods at room temperature prior to use for controlling odor production from said waste.

These and other objects will become increasingly apparent by reference to the following description and the drawings.

DETAILED DESCRIPTION OF THE DRAWINGS

DETAILED DESCRIPTION OF THE INVENTION

Figure 1:
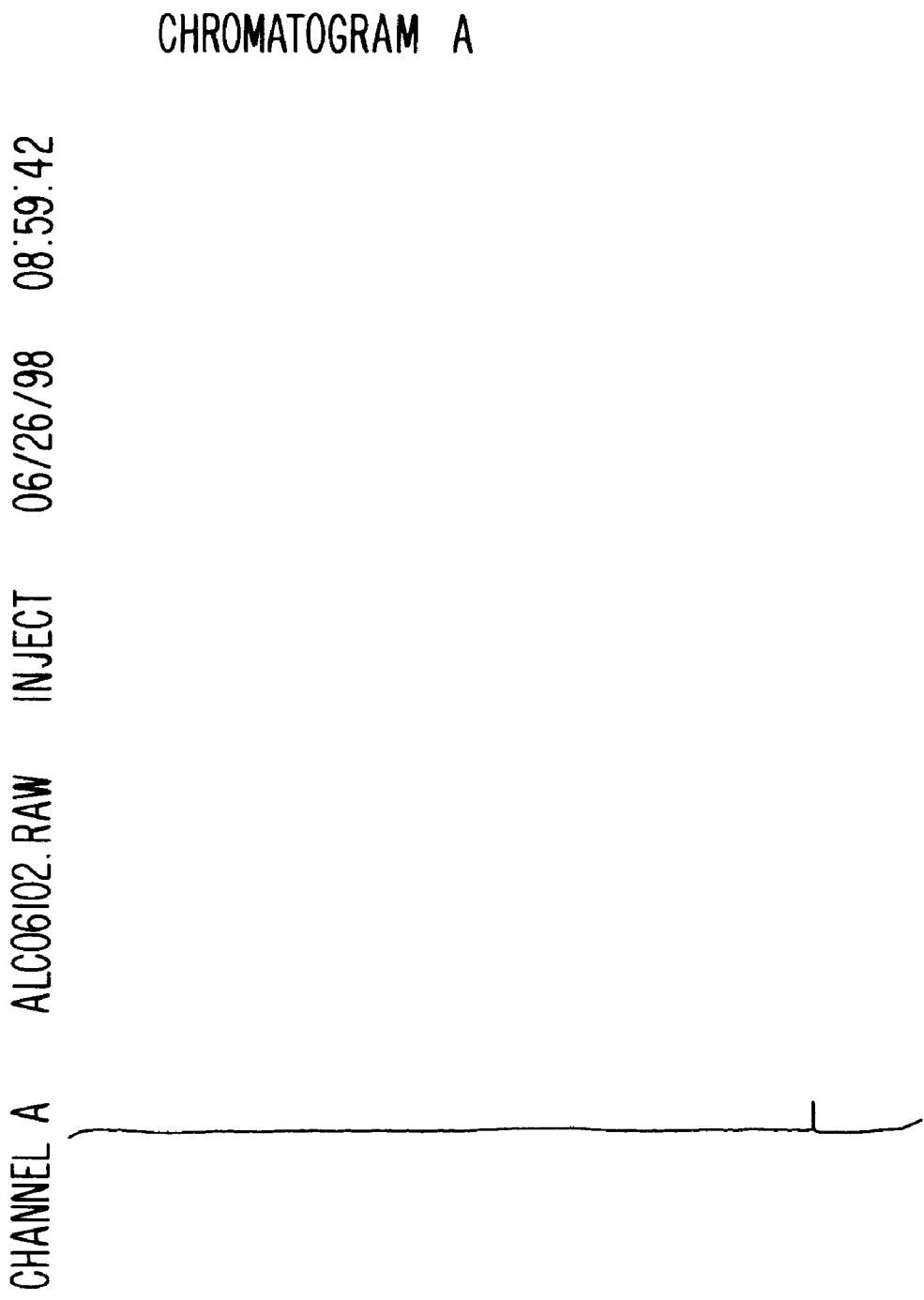
FIG. 1 is a chromatogram of the air above a hog waste system pit treated with Pseudomonas compositions of the present invention.

The present invention provides compositions for control of odor production in animal waste pits or similar waste holding facilities which comprise an effective amount of Pseudomonas sp. which substantially reduce the production of odor from said waste holding facilities. The composition is added to the waste. The composition comprises at least one of the Pseudomonas sp. selected from the group consisting of *Pseudomonas putida* isolate PPU 9.0 and *Pseudomonas fluorescens* isolate PFL 2.1. Both isolates, PFL 2.1 and PPU 9.0, were deposited under the terms of the Budapest Treaty at the Northern Regional Research Laboratory (NRRL), Peoria, Ill. as NRRL-21658 on Feb. 21, 1997 and NRRL-B-30044 on Aug. 6, 1998, respectively. The isolates PPU 9.0 and PFL 2.1 comprising the composition of the present invention are particularly useful for the assimilation of ammonia into nitrogen containing compounds, thereby reducing the loss of nitrogen as ammonia from animal waste. In particular, isolate PPU 9.0 which was isolated from a waste lagoon from a hog farm can assimilate ammonia at concentrations at least as high as 1,000 ppm. Therefore, the present invention provides compositions useful for reducing the concentration of ammonia in animal waste. The Pseudomonas sp. of the present invention are also capable of degrading skatole, manure and reducing COD. Either PFL 2.1 and PPU 9.0 separately, or in combination, can degrade ammonia at a level of at least 500 ppm ammonia in fecal matter, urine or combinations thereof.

The Pseudomonas sp. isolates PPU 9.0 and PFL 2.1 have the properties set forth below. Both isolates can grow and assimilate ammonia in medium consisting essentially of 40 mM phosphate buffer, pH 6.8 having ammonium sulfate and dextrose to provide a C:N:S ratio of 1,000:1,000:1,000 ppm. Both isolates in the abovementioned medium having a C:N:S ratio of 500:500:500 ppm can assimilate approximately 94% of the ammonia. Isolate PFL 2.1 can grow in medium having a C:N:S ratio of 500:500:500 ppm. Isolate PPU 9.0 can assimilate approximately 98% of the ammonia in the abovementioned media having a C:N:S ratio of 1,000:1,000:1,000 ppm.

The composition of the present invention can be an aqueous solution frozen with a suitable preservative or dried, such as by lyophilization, with a suitable carrier. In the preferred embodiment, the composition comprises an aqueous storage medium or carrier which is storable at room temperature.

The preferred composition comprises at least $1 \times 10_6$ colony forming units (CFU) of at least one of the Pseudomonas sp. selected from the group consisting of PFL 2.1 and PPU 9.0 per ml. In the preferred composition, the Pseudomonas sp. is in an aqueous storage medium wherein the bacteria are maintained in a viable state. The aqueous composition can be stored in a leakproof container, such as a plastic bag, plastic lined container, plastic container, glass container, metal foil bag or a sealable bucket-type container.

The preferred embodiment of the composition comprises an aqueous storage medium or carrier which comprises either a mixture of the Pseudomonas sp. PPU 9.0 and PFL 2.1 or PPU 9.0 at $1 \times 10^6$ to $1 \times 10^{10}$ CFU per ml in a solution consisting essentially of an alkali metal nitrate in an amount between about 0.1% and 5% by weight of the water, and optionally a buffering amount of monoammonium phosphate to provide a pH within the range of 6 to 7, so that the bacterium are preserved in living form at 25° C. Preferably, the alkali metal nitrate is in a weight ratio of 1:1 to 125:1 to the monoammonium phosphate. The composition can be stored at a temperature between about 8 and 35° C. to provide the preferred bacterium. The storage medium allows the Pseudomonas sp. to be stored as an aqueous solution which is storage stable at room temperatures for storage, shipment and use wherein the Pseudomonas sp. is immediately active for use without the use of a bulk starter. Compositions comprising Pseudomonads in the storage medium disclosed herein are also disclosed in related and co-pending U.S. patent application Ser. No. 08/819,855. Storage media that comprise other alkali metal nitrates and buffering compounds are within the scope of the present invention.

To prepare the composition of the invention, the Pseudomonas sp. are admixed into the storage medium. The Pseudomonas sp. are generally mixed with the storage medium in an amount that is sufficient to provide at least $1 \times 10^6$ CFU per ml. Further, the composition may include other materials such as bacterial enzymes or other non-pathogenic bacteria that may facilitate degradation of solid wastes in the waste holding facility thereby complementing the degradation and odor reducing activity of Pseudomonas sp. Other bacteria that can be included in the composition may be other nitrogen-fixing bacteria such as bacillus bacteria such as *Azobacier vinelandii*, or the like. Other microorganisms that can be included in the composition that have value in degrading solid wastes are yeasts such as Candida utilis, green algae such as Chorella, non-pathogenic forms of Streptococcus sp., and Lactobacillus sp.

The present invention provides a method for control of odor production in animal waste pits or similar waste holding facilities. The method comprises adding the composition of the present invention to the waste holding facility wherein the composition comprises a mixture of an effective amount of either a mixture of the Pseudomonas sp. PFL 2.1 and PPU 9.0, or PPU 9.0, and mixing the composition into the waste. The Pseudomonas sp. comprising the composition multiply and proliferate and assimilate compounds that are associated with offensive odors from said waste thereby reducing the production of offensive odors produced by said waste. Since the Pseudomonas sp. also have the ability to degrade skatole, manure and reduce COD the method is useful for degrading such compounds. Furthermore, the inclusion of other microorganisms in other embodiments of the composition of the present invention complement the degradation activity of the Pseudomonas sp. thereby enhancing the method of the present invention for controlling odor produced by waste holding facilities. The method is useful for lagoon pits, manure pits, and other similar facilities for holding waste wherein means for aerating the facility are not available.

In a preferred method of the present invention the composition consisting of either a mixture of PFL 2.1 and PPU 9.0, or PPU 9.0 is added to the animal waste in the waste holding facility, mixing the composition into the waste material, and aerating the mixture so as to cause the Pseudomonas sp. comprising the composition to multiply and proliferate and thereby assimilate compounds associated with production of offensive odors thereby reducing the production of offensive odors produced by said waste. The preferred method using aeration reduces the production of volatile fatty acids, and various other compounds which are also associated with very offensive odors and tend to develop in anaerobic environments, i.e at the bottom of non-aerated waste holding facilities.

The method of the present invention reduces the concentration of ammonia in animal waste. Specifically, the method comprises adding the composition of the present invention to the waste holding facility wherein the composition comprises a mixture of an effective amount of either a mixture of PFL 2.1 and PPU 9.0, or PPU 9.0, and mixing the composition into the waste holding facility. The Pseudomonas sp. comprising the composition multiply and proliferate and are capable of assimilating ammonia produced from said waste holding facility thereby reducing the concentration of ammonia in said waste holding facility.

In a preferred embodiment of the present invention for reducing the concentration of ammonia in animal waste, the composition consisting of either a mixture of PFL 2.1 and PPU 9.0, or PPU 9.0 is added to the animal waste in the waste holding facility, mixing the composition into the waste material in the waste holding facility, and aerating the mixture so as to cause the Pseudomonas sp. comprising the composition to multiply and proliferate and thereby assimilate ammonia produced from said waste holding facility thereby reducing the concentration of ammonia in said waste holding facility.

In the preferred embodiment for control of fecal odor production in waste containing fecal matter or urine or combinations thereof, the steps comprise providing a composition which comprises water, an alkali metal nitrate in an amount between about 0.1 and 5% by weight of the water and optionally a buffering amount of monoammonium phosphate, and a Pseudomonas sp. which degrades ammonia at a level of at least 500 ppm of ammonia in fecal matter, urine or a combination thereof. Holding the composition at a temperature between about 8 and 35° C. to provide a preserved bacterium. Then mixing the composition into the waste wherein the Pseudomonas sp. reduces the production of odor.

The composition according to the method of the present invention comprises the Pseudomonas sp. PFL 2.1 and PPU 9.0 at an amount between about $1\times10^6$ to $1\times10^{10}$ CFU/ml. In a preferred composition according to the method of the invention, the composition comprises the Pseudomonas sp PPU 9.0 at an amount between $1\times10^6$ to $1\times10^{10}$ CFU/ml.

Waste for purposes of the present invention comprises fecal matter, urine or combinations thereof. Waste containing fecal matter is defined as manure. The waste may be waste accumulated by animal farming or the waste in municipal waste treatment facilities. An example of the processing of animal waste is exemplified by the system in a swine production facility. Most wastes are flushed, washed, pumped, scraped, or otherwise removed from swine buildings, usually with water, and stored in lagoons as manure. Manure can also be stored as a liquid in other storage facilities such as concrete or metal tanks, opened or covered, and in earthen storage and treatment basins wherein over time the manure is digested by naturally occurring microorganisms into agriculturally useful products such as fertilizers. The manure in a storage facility can be aerated by mechanical means to increase aerobic digestion of the manure which in turn reduces the odor of the manure. In the absence of aeration, anaerobic fermentation predominates in the holding facility wherein many volatile compounds with offensive odors are produced. Waste handling processes at cattle feedlots and poultry farms are similar.

The composition and method of the present invention is easily adaptable to the aforementioned process for handling animal wastes. The composition can be added to the manure in dry form or as a liquid at the same time or after the manure is added to the storage facility. The manure and the added composition of the present invention can be aerated to promote aerobic digestion or stored under conditions wherein digestion is predominately anaerobic. The present invention can be used in conjunction with methods and compositions that liquify solid animal wastes such as that disclosed in U.S. Pat. No. 5,627,069 to Powlen which is herein incorporated by reference. The present invention can be used in concert with waste treatment strategies disclosed in Mackie et al. (ibid.) and recommendations disclosed in the Swine Odor Task Force Report published Mar. 1, 1995 by the North Carolina Agricultural Research Service, North Carolina State University which are herein incorporated by reference.

The storage medium comprising the present invention and disclosed in related and copending U.S. patent application Ser. No. 08/819,855 is characterized by the unexpected finding that low levels of an alkali metal nitrate, particularly sodium or potassium nitrate, alone are sufficient to preserve bacterial counts over a period of up to 160 days or longer at room temperatures. The amount of alkali metal nitrate used is between 0.1 to 5% by weight of the water. The culture contains between about $1\times10^6$ and $1\times10^{10}$ CFU per ml which is more than sufficient for the usual bioremediation such as reducing ammonia or controlling odors produced in animal waste holding facilities.

The mechanism of the preservation is not understood. The nitrate provides an electron source for the bacteria so that the nitrate is degraded to nitrogen according to the formula:

$$2NO_2^- + 10 \text{ electrons} + 12H^+ = N_2 + 6H_2O$$

Normal tap water is slightly acidic ($H_3O^+$) and can provide the H+ ions. If necessary, small amounts of acid can be added. In any event, the pH is preferably between pH 6 and 7. The alkali metal can be sodium or potassium.

The stability of Pseudomonas sp. in the storage medium of the present invention is shown in Table 1. Bacteria (*Pseudomonas putida*) NRRL-18118 and NRRL-15078 (described in U.S. Pat. No. 4,910,143 to Vandenbergh and U.S. Pat. No. 4,508,824 to Olsen) and *Pseudomonas fluorescens* NRRL-21658 (described in related and copending U.S. patent application Ser. No. 08/819,855) in equal volumes were added to bottles containing either 0.26% by weight solution of sodium nitrate or water (control). The control bottle had a significant loss of bacteria after 28 days (96.4% loss) whereas the bottle with the sodium nitrate lost only 38% of the bacteria.

TABLE 1

| Day | Control (CFU/ml) | Sodium nitrate solution (CFU/ml) |
| --- | --- | --- |
| 0 | $2.5 \times 10^8$ | $2.5 \times 10^8$ |
| 14 | $6.0 \times 10^7$ | $2.0 \times 10^8$ |
| 21 | $5.0 \times 10^8$ | $2.0 \times 10^8$ |
| 28 | $9 \times 10^6$ | $1.8 \times 10^8$ |

Table 2 shows that the addition of monoammonium phosphate as a buffer to a solution of sodium nitrate provides a storage medium that further enhances the viability of the Pseudomonas sp. NRRL-18118, NRRL-15078 and NRRL-21658 over an extended period of time. Table 2 shows that solutions having a sodium nitrate to monoammonium phosphate ratio ranging from 3.2:1 to 125:1 by weight extended the viability of the Pseudomonas sp. for at least 28 days when stored at room temperatures. A ratio of sodium nitrate to monoammonium phosphate between 3.2:1 and 26:1 is preferred because the bacteria increased in numbers.

TABLE 2

| | Ratio of sodium nitrate to monoammonium Phosphate | | | |
| --- | --- | --- | --- | --- |
| Day | 3.2:1 | 6.5:1 | 13:1 | 26:1 |
| 0 | $1.8 \times 10^{8*}$ | $2.2 \times 10^8$ | $3.4 \times 10^8$ | $5.2 \times 10^8$ |
| 8 | $2.2 \times 10^8$ | $2.3 \times 10^8$ | $3.8 \times 10^8$ | $2.9 \times 10^8$ |
| 16 | $3.3 \times 10^8$ | $3.2 \times 10^8$ | $2.3 \times 10^8$ | $3.2 \times 10^8$ |
| 28 | $2.3 \times 10^8$ | $2.8 \times 10^8$ | $4.6 \times 10^8$ | $2.5 \times 10^8$ |

| | Ratio of sodium nitrate to monoammonium Phosphate | | | |
| --- | --- | --- | --- | --- |
| Day | 62:1 | 100:1 | 125:1 | 188:1 |
| 0 | $1.2 \times 10^{8*}$ | $1.4 \times 10^8$ | $1.4 \times 10^8$ | $3.4 \times 10^8$ |
| 7 | $3.0 \times 10^8$ | $1.0 \times 10^8$ | $2.8 \times 10^7$ | $<10^6$ |
| 13 | $2.0 \times 10^8$ | $1.2 \times 10^8$ | $5.0 \times 10^7$ | $<10^6$ |
| 27 | $1.9 \times 10^8$ | $1.0 \times 10^8$ | $3.0 \times 10^7$ | $<10^6$ |

*CFU/ml

Tables 1 and 2 show the significance of the storage medium comprising the composition of the present invention. It is conventional in the art for storing Pseudomonad compositions that the compositions are dried, such as by lyophilization, or frozen with preservatives. In order to stabilize dried bacteria, stabilizers are generally added. Regardless of whether the bacteria are dried or frozen, there is a significant die-off of the bacteria over time (usually 75% by cell count) due to the method of preservation. Furthermore, it is well known in the art that cultures stored in the conventional manner need to be reactivated in a bulk starter medium in order to increase the number and viability of the bacteria. Therefore, the storage medium disclosed herein allows aqueous Pseudomonad compositions such as the composition comprising the present invention to be stored, shipped and used in a form that is immediately active without the use of a bulk starter. In addition, the storage medium is inexpensive to produce and does not require specialized equipment.

For purposes of promoting a further understanding of the present invention, the following examples are provided.

EXAMPLE 1

*Pseudomonas fluorescens* (PFL 2.1) and *Pseudomonas putida* (PPU 9.0) were each evaluated for the ability to utilize ammonia. The experiments tested ammonia utilization by PFL 2.1 and PPU 9.0 at two concentrations of ammonia. The first experiment separately tested ammonia utilization of PFL 2.1 and PPU 9.0 in medium having a carbon, nitrogen, and sulfur ratio (C:N:S) of 1,000:500:500 in parts per million (ppm), and the second experiment separately tested PFL 2.1 and PPU 9.0 in medium having a C:N:S ratio of 1,000:1,000:1,000 ppm. The medium consisted of 94 ml of HPLC water with the addition of 4 ml of a 1 M stock of sodium phosphate and potassium phosphate buffer, pH 6.8, 1 ml of 10 g/liter dextrose, and either 0.5 ml of 5 g/liter ammonia sulfate stock (1,000:500:500 C:N:S ratio) or 1 ml of 5 g/liter ammonia sulfate stock (1,000:1,000:1,000 C:N:S ratio). Each experiment was performed in a 250 ml Erlenmeyer flask containing the abovementioned medium inoculated with either PPU 9.0 or PFL 2.1 at $10^3$ CFU/ml which was then incubated at 25° C. with shaking. After 24 hours incubation the medium was analyzed for ammonia and bacterial growth.

Table 3 shows growth and ammonia utilization 24 hours post-inoculation when the medium contained 500 ppm ammonia.

TABLE 3

| C:N:S ratio 1,000:500:500 ppm | | | |
| --- | --- | --- | --- |
| Strain | Ammonia (0 hr.) | Ammonia (24 hr.) | $A_{420}$ (24 hr.) |
| PFL 2.1 | 500 ppm | 32 ppm | 0.25 |
| PPU 9.0 | 500 ppm | 30 ppm | 0.09 |

Table 4 shows growth and ammonia utilization 24 hours post-inoculation when the medium contained 1,000 ppm ammonia.

TABLE 4

| C:N:S ratio 1,000:1,000:1,000 ppm | | | |
| --- | --- | --- | --- |
| Strain | Ammonia (0 hr.) | Ammonia (24 hr.) | $A_{420}$ (24 hr.) |
| PFL 2.1 | 1,000 ppm | 500 ppm | 0.26 |
| PPU 9.0 | 1,000 ppm | 81 ppm | 0.25 |

These results show that both strains were effective in the utilization of ammonia. At a C:N:S ratio of 1,000:500:500 both PFL 2.1 and PPU 9.0 reduced ammonia levels to approximately 6% of the starting level, however PPU 9.0 did not appear to grow as efficiently as PFL 2.1. However, at higher ammonia levels as shown in Table 3, PPU 9.0 grew as well as PFL 2.1 but PPU 9.0 was much more efficient at reducing ammonia levels than PFL 2.1, PPU 9.0 causing a 92% decrease in ammonia whereas PFL 2.1 caused only a 50% reduction in ammonia. Therefore, both strains are effective at utilizing ammonia with PPU 9.0 most effective at higher levels of ammonia, and PFL 2.1 most effective at lower levels.

These results indicate that a mixture of PFL 2.1 and PPU 9.0 are effective at reducing high levels of ammonia. At a high ammonia level PPU 9.0 grows and is very effective at reducing ammonia levels to within a range that enables PFL 2.1 be efficient at removing ammonia. Therefore, a composition comprising PPU 9.0 and PFL 2.1 would be effective for utilizing ammonia for wide range of ammonia concentrations.

EXAMPLE 2

A mixture of PPU 9.0 and PFL 2.1 at a 1 to 1 ratio by volume at $10^3$ CFU/ml was evaluated for the ability to degrade skatole. The mixture was inoculated into a culture medium containing dextrose as the carbon source, sodium nitrate as the nitrogen source and magnesium sulfate as the sulfur source to provide a C:N:S ratio of 500:500:500 ppm. A control consisted of the same medium without the addition of bacterial composition. The medium was supplemented with skatole at 100 ppm. The inoculated medium was evaluated for odor and skatole degradation 24 hours and 48 hours post-inoculation. Odor was ranked on an olfactory scale wherein 0 indicates no odor, +1 indicates slight odor, +2 indicates moderate odor, and +3 indicates strong odor. Skatole degradation was determined by use of Ehrlich's reagent for detection of indole wherein a purple color indicated the sample contained greater than 10 ppm skatole as indole and no color indicated less than 10 ppm skatole.

The results presented in Table 5 show that after 24 hours the bacterial composition had reduced skatole from 100 ppm to less than 10 ppm and had reduced the odor emitted from the culture to slightly detectable. The control still emitted a strong odor and had greater than 10 ppm indole. By 48 hours there was no detectable odor emitted from the culture containing the bacterial composition whereas the control still produced a strong odor. The result of this example shows that the bacterial composition is effective at reducing odor and degrading skatole.

TABLE 5

| Sample | 24 Hours | | 48 Hours | |
|---|---|---|---|---|
| | Olfactory | Color | Olfactory | Color |
| Control | +3 | detected | +3 | ND |
| Bacterial composition | +1 | ND | 0 | ND |

ND - not detected

EXAMPLE 3

The bacterial composition comprising a mixture of PPU 9.0 and PFL 2.1 of Example 2 was evaluated for the ability to control the odor from chicken manure. A culture consisting of HPLC grade sterile water containing 10 g of chicken manure was inoculated with the bacterial composition which comprised a 1:1 ratio of PFL 2.1 and PPU 9.0 at $1 \times 10^6$ colony forming units (CFU)/ml. A culture without the bacterial composition served as a control. A first experiment consisted of the inoculated culture and an uninoculated control were incubated at 25° C. without shaking (anaerobic or static conditions), and a second experiment identical to the first except that the inoculated and uninoculated cultures were incubated at 25° C. with shaking to provide aeration. Ammonia and COD were measured in ppm and odor strength was evaluated by use of an olfactory scale ranging from 0 to +5, wherein 0 is no detectable odor and +5 is very strong odor.

The results of the experiment, presented in Table 6 show that after 48 hours with aeration the bacterial composition was effective in reducing odor from very strong (+5) to slightly detectable (+1). In addition ammonia was reduced 87% and COD was reduced 80%. In the control with aeration, ammonia was not reduced even though COD was reduced 88%. These results clearly show that the bacterial composition with aeration was very effective at reducing odor from manure.

TABLE 6

| | | Static | | Shaking | |
|---|---|---|---|---|---|
| | | Control | Composition | Control | Composition |
| 0 hr. | Ammonia | 34,100 | 34,100 | 34,100 | 34,100 |
| | COD | 91,800 | 91,800 | 91,800 | 91,800 |
| | Olfactory | +5 | +5 | +5 | +5 |
| 48 hr. | Ammonia | 16,500 | 12,450 | 11,100 | 4,250 |
| | COD | 82,400 | 90,600 | 91,130 | 18,500 |
| | Olfactory | +4 | +3 | +3 | +1 |

EXAMPLE 4

Use of the bacterial composition comprising a mixture of PFL 2.1 and PPU 9.0 as in Example 2 was used to remove ammonia from a waste water treatment system. The daily wastewater that flows into the plant was 0.85 million gallons and inlet ammonia levels were 120 ppm. The inflow of wastewater initially flows into a 7.5 million gallon anaerobic lagoon reactor. Afterwards the wastewater is transferred to a series of 0.6 million gallon aerated lagoon reactors. Adding the bacterial composition to the wastewater treatment system reduced ammonia levels to 72 ppm within 48 hours.

EXAMPLE 5

A field trial was designed to evaluate whether the bacterial composition comprising the mixture of PFL 2.1 and PPU 9.0 of Example 2 would be effective in removing ammonia from hog farm waste stored in a non-aerated waste pit system, thereby effecting odor control. The bacterial composition was added to the hog farm waste system and maintained at a level of $1 \times 10^6$ CFU/ml. Ammonia and COD were measured over a four week time period after addition of the bacterial composition. A system without the addition of the bacterial composition served as a control. Weekly, 3 ml samples were removed from the room air above the pits for analysis of ammonia content and 500 µl liquid samples were removed from the pit for COD analysis. Both analyses were performed by headspace analysis using a Varian Model 3700 Gas Chromatograph with a flame ionization detector. The samples were applied to a six foot by ⅛th inch inner diameter glass column containing 5% carbowax on an 80/100 mesh carbopack. The carrier gas was nitrogen at 30 cc/minute. The temperature program used was two minutes at 70° C., followed by raising the temperature to 200° C. at a rate of 10 degrees/minute wherein the samples were then held at 200° C. for 20 minutes.

The results shown in Table 7 show that the bacterial composition applied to a hog farm waste pit system effectively reduced COD to 57% of the levels in the untreated pit and importantly effectively reduced the ammonia in the treated pit to 81% of the level in the untreated pit.

TABLE 7

| Week | COD | | Ammonia | |
| --- | --- | --- | --- | --- |
| | Control | Composition | Control | Composition |
| 1 | 36,500 | 12,100 | 167,000 | 30,000 |
| 2 | 34,800 | 14,300 | 160,000 | 63,200 |
| 3 | 40,900 | 13,600 | 334,000 | 30,000 |
| 4 | 36,000 | 23,500 | 218,000 | 42,000 |
| Average | 37,050 | 15,875 | 219,750 | 41,300 |
| (% reduction) | | (57%) | | (81%) |

Figure 2:
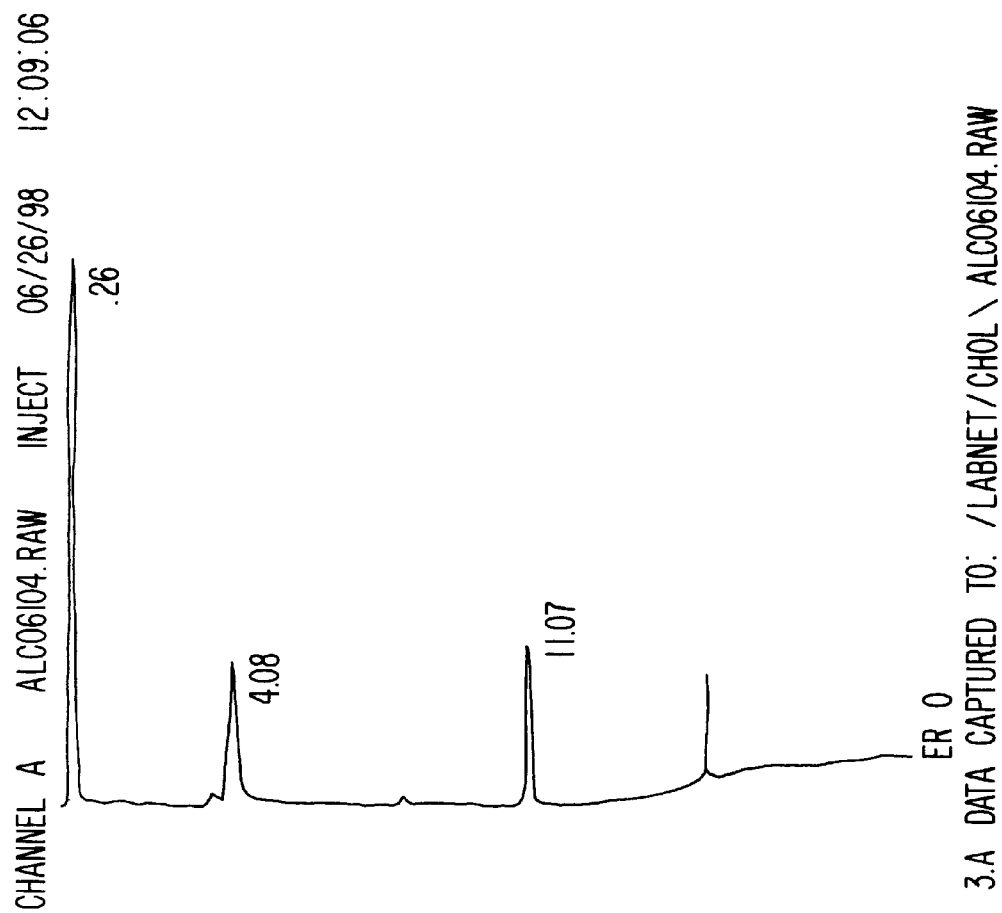
FIG. 2 is a chromatogram of the air above a hog waste system pit not treated with Pseudomonas compositions of the present invention.
Figure 3:
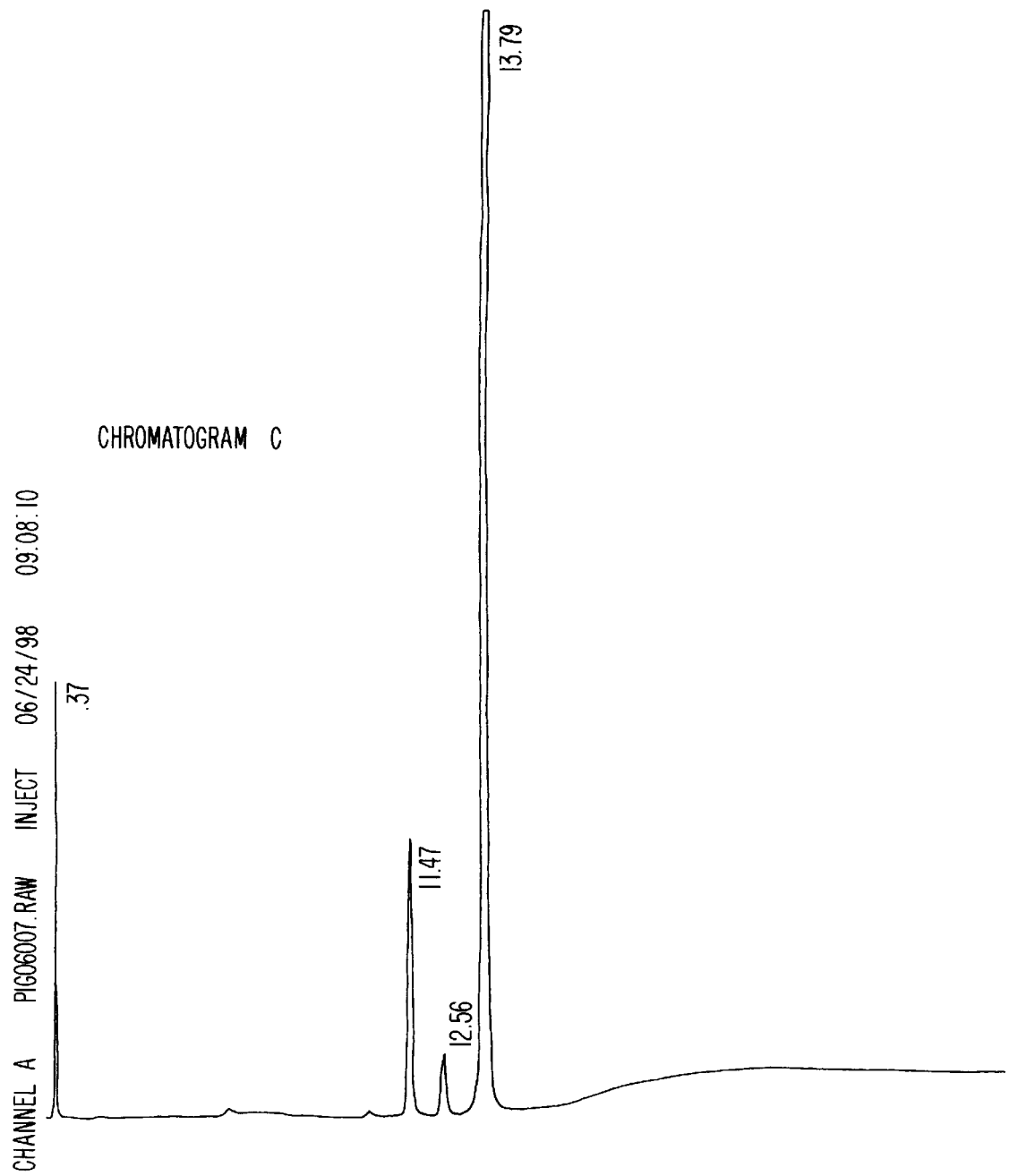
FIG. 3 is a chromatogram of the liquid from a hog waste system pit treated with Pseudomonas compositions of the present invention.
Figure 4:
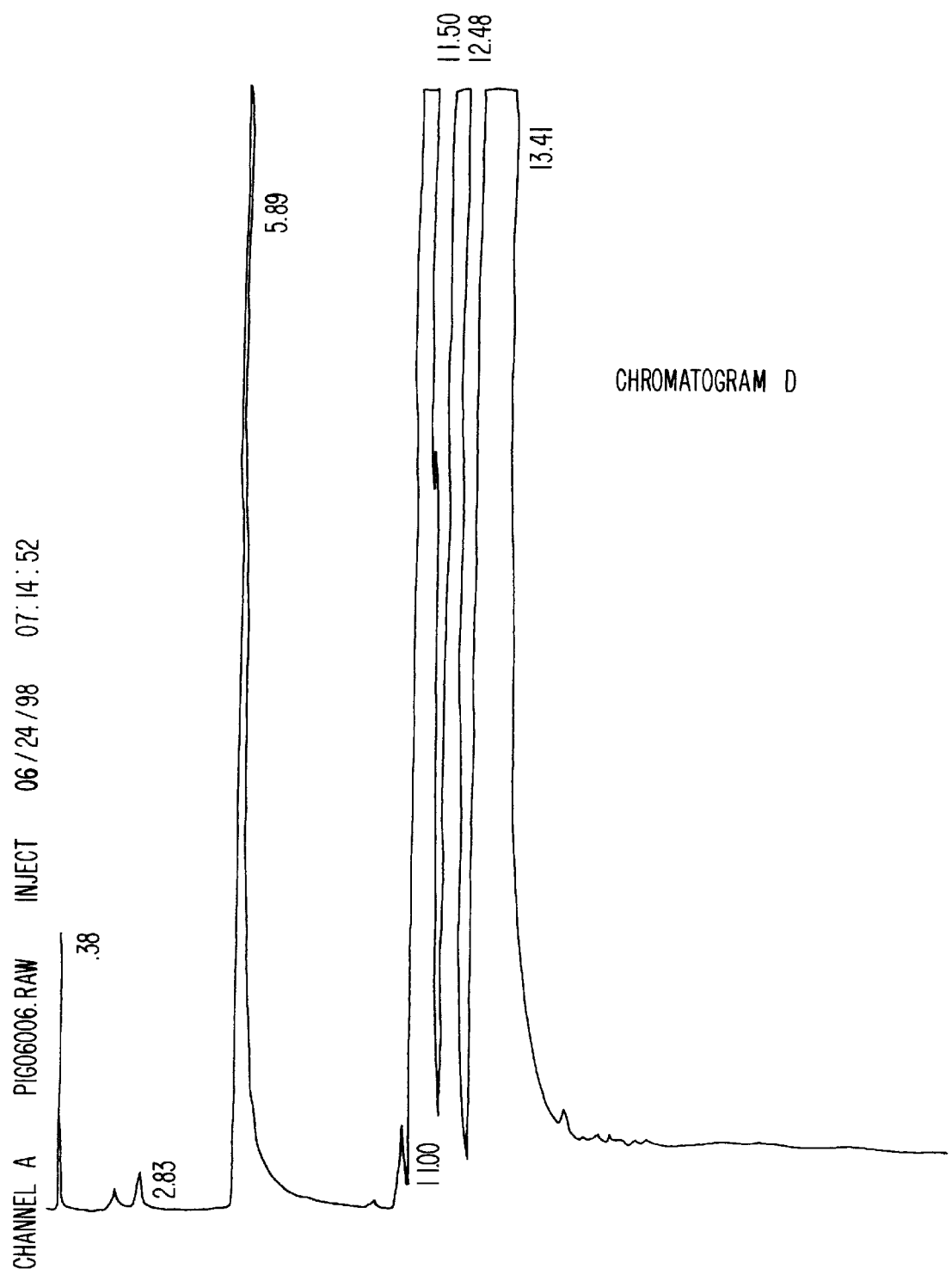
FIG. 4 is a chromatogram of the liquid from a hog waste system pit not treated with Pseudomonas compositions of the present invention.

FIGS. 1 and 2 show gas chromatograms of air samples collected above the bacterial composition treated pit and the untreated pit, respectively. The bacterial composition prevented release of the compounds into the air that were released from the untreated pit and detected as three peaks having mobilities of 0.26, 4.08 and 11.07 on the gas chromatogram in FIG. 2. These three volatile compounds may be associated with odors detectable by humans. Gas chromatograms of liquid samples from the bacterial composition treated pit (FIG. 3) and the untreated pit (FIG. 4) also showed that the bacterial composition was effective in reducing the number of undesirable compounds. Liquid from the bacterial composition treated pit produced only three detectable peaks with mobilities of 11.47, 12.56, and 13.79 on the gas chromatogram (FIG. 3) whereas liquid from the untreated pit produced a wide array of peaks with mobilities on the gas chromatogram ranging from 0.38 to 13.41 (FIG. 4). These results are important because they indicate that under field conditions the bacterial composition will effectively control the level of odor production from fecal matter.

While the present invention is described herein with reference to illustrated examples, it should be understood that the invention is not limited hereto. Those having ordinary skill in the art and access to the teachings herein will recognize additional modifications and embodiments within the scope thereof. Therefore, the present invention is limited only by the claims attached hereto.

We claim:

1. A method for control of odor production in waste containing fecal matter or urine or combination thereof, the steps comprising:
   adding to the waste an effective amount of a composition comprising a viable Pseudomonas sp. isolated from hog manure which degrades ammonia at a level of at least 500 ppm of ammonia in fecal matter, urine or a combination thereof;
   mixing the composition into the waste; and
   aerating the waste to maintain an aerobic environment wherein the Pseudomonas sp. reduces the production of odor.

2. The method of claim 1 wherein the Pseudomonas sp. is a mixture of *Pseudomonas putida* PPU 9.0 deposited as NRRL-B-30044 and *Pseudomonas fluorescens* PFL 2.1 deposited as NRRL-21658.

3. The method of claim 1 wherein the composition comprises at least $1 \times 10^6$ colony forming units of the Pseudomonas sp.

4. A method for control of fecal odor production in waste containing fecal matter or urine or combination thereof, comprising:
   (a) adding to the waste an effective amount of a composition comprising a viable Pseudomonas sp. isolated from hog manure which degrades ammonia at a level of at least 500 ppm of ammonia in fecal matter, urine or a combination thereof; and
   (b) mixing the composition into the waste wherein the Pseudomonas sp. reduces the production of odor.

5. The method of claim 4 wherein the Pseudomonas sp. is a mixture of *Pseudomonas putida* PPU 9.0 deposited as NRRL-B-30044 and *Pseudomonas fluorescens* PFL 2.1 deposited as NRRL-21658.

6. The method of claim 4 wherein the composition comprises at least $1 \times 10^6$ colony forming units of the Pseudomonas sp.

7. A method for control of odor production in waste water containing fecal matter or urine or combination thereof, the steps comprising:
   adding to the waste an effective amount of a composition comprising Pseudomonas sp. PPU 9.0 deposited as NRRL-B-30044;
   mixing the composition into the waste; and
   aerating the waste to maintain an aerobic environment wherein the Pseudomonas sp. reduces the production of odor.

8. The method of claim 7 wherein the Pseudomonas sp. is a mixture of the *Pseudomonas putida* deposited as PPU 9.0 as NRRL-B-30044 and *Pseudomonas fluorescens* PFL 2.1 deposited as NRRL-21658.

9. The method of claim 7 wherein the composition comprises at least $1 \times 10^6$ colony forming units of the Pseudomonas sp.

10. A method for control of odor production in waste water containing fecal matter or urine or combination thereof, comprising:
    adding to the waste an effective amount of a composition comprising Pseudomonas sp. PPU 9.0 deposited as NRRL-B-30044; and
    mixing the composition into the waste wherein the Pseudomonas sp. reduces the production of odor.

11. The method of claim 10 wherein the Pseudomonas sp. is a mixture of the *Pseudomonas putida* PPU 9.0 deposited as NRRL-B-30044 and *Pseudomonas fluorescens* PFL 2.1 deposited as NRRL-21658.

12. The method of claim 10 wherein the composition comprises at least $1 \times 10^6$ colony forming units of the Pseudomonas sp.

13. A method for control of fecal odor production in waste containing fecal matter or urine or combination thereof, comprising:
    (a) providing a composition which comprises
        (1) water;
        (2) an alkali metal nitrate in an amount between about 0.1 and 5% by weight of the water and optionally a buffering amount of monoammonium phosphate; and (3) a Pseudomonas sp. isolated from hog manure which degrades ammonia at a level of at least 500 ppm of ammonia in fecal matter, urine or a combination thereof;

(c) holding the composition at a temperature between about 8 and 35° C. to provide a preserved bacterium; and (d) mixing the composition into the waste wherein the Pseudomonas sp. reduces the production of odor.

14. The method of claim 13 wherein the Pseudomonas sp. is a mixture of *Pseudomonas putida* PPU 9.0 deposited as NRRL-B-30044 and *Pseudomonas fluorescens* PFL 2.1 deposited as NRRL-21658.

15. The method of claim 13 wherein the Pseudomonas sp. is *Pseudomonas putida* PPU 9.0 deposited as NRRL-B-30044.

16. The method of claim 13 wherein the composition comprises at least $1\times10^6$ colony forming units of the Pseudomonas sp.

17. The method of claim 13 wherein the alkali metal is sodium.

18. The method of claim 13 wherein the monoammonium is included in a weight ratio between about 1:1 and 125:1 alkali metal to ammonium nitrate.

* * * * *

UNITED STATES PATENT AND TRADEMARK OFFICE
CERTIFICATE OF CORRECTION

PATENT NO. : 6,068,774
DATED : May 30, 2000
INVENTOR(S) : Peter A. Vandenbergh and Hiren K. Trivedi It is certified that error appears in the above-identified patent and that said Letters Patent is hereby corrected as shown below:

Column 4, line 30, "at least 1 x 10$_6$" should be --at least 1 x 10$^6$--.

Column 7, Table 2, lines 61 and 62 "1.2 x 10$^8$" should be --1.2 x 10$^7$--; "1.0 x 10$^8$" should be --1.0 x 10$^7$; "10$^6$" should be --10$^4$--; "10$^6$" should be --10$^4$--.

Signed and Sealed this

Tenth Day of April, 2001

Attest:

NICHOLAS P. GODICI

*Attesting Officer*  Acting Director of the United States Patent and Trademark Office